United States Patent
Kuang et al.

(10) Patent No.: US 9,860,332 B2
(45) Date of Patent: Jan. 2, 2018

(54) CACHING ARCHITECTURE FOR PACKET-FORM IN-MEMORY OBJECT CACHING

(71) Applicant: Samsung Electronics Co., Ltd., Suwon-si, Gyeonggi-do (KR)

(72) Inventors: Jilong Kuang, San Jose, CA (US); Daniel G. Waddington, Morgan Hill, CA (US); Juan Colmenares, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 560 days.

(21) Appl. No.: 14/191,959

(22) Filed: Feb. 27, 2014

(65) Prior Publication Data

US 2014/0337459 A1 Nov. 13, 2014

Related U.S. Application Data

(60) Provisional application No. 61/821,156, filed on May 8, 2013.

(51) Int. Cl.
*H04L 29/08* (2006.01)
*H04L 12/743* (2013.01)

(52) U.S. Cl.
CPC ...... *H04L 67/2842* (2013.01); *H04L 67/2871* (2013.01); *H04L 45/7453* (2013.01)

(58) Field of Classification Search
CPC ............. H04L 67/2842; H04L 67/2871; H04L 45/7453

See application file for complete search history.

(56) References Cited

U.S. PATENT DOCUMENTS

| | | | |
|---|---|---|---|
| 5,502,833 A | 3/1996 | Byrn et al. | |
| 5,787,470 A | 7/1998 | Desimone et al. | |
| 6,061,351 A | 5/2000 | Erimli et al. | |
| 6,393,526 B1 | 5/2002 | Crow et al. | |
| 6,754,662 B1 * | 6/2004 | Li | G06F 17/30949 707/693 |
| 7,051,161 B2 | 5/2006 | Dixit et al. | |
| 7,747,737 B1 * | 6/2010 | Apte | H04L 43/028 370/230.1 |
| 7,814,129 B2 * | 10/2010 | Williams | G06F 17/30159 707/812 |
| 7,860,948 B2 | 12/2010 | Hundscheidt et al. | |
| 8,019,901 B2 | 9/2011 | Starr et al. | |

(Continued)

OTHER PUBLICATIONS

Roccen, "NTZC—Packet zero copy support module for network applications", Google Project Hosting, 2010, pp. 1-2, Google.com, United States [downloaded from http://code.google.com/p/ntzc/ on May 28, 2015].

(Continued)

*Primary Examiner* — Abdullahi E Salad
(74) *Attorney, Agent, or Firm* — Sherman IP LLP; Kenneth L. Sherman; Hemavathy Perumal

(57) ABSTRACT

One embodiment provides a caching system comprising a hash table, a network interface for receiving a sequence of network-level packets for caching, and a caching application module for storing the sequence of network-level packets in the hash table. The sequence of network-level packets is stored its original form without de-fragmentation.

20 Claims, 9 Drawing Sheets

(56) References Cited

U.S. PATENT DOCUMENTS

| | | | |
|---|---|---|---|
| 8,019,925 B1* | 9/2011 | Vogan | G06F 12/04 711/202 |
| 8,165,146 B1 | 4/2012 | Melick et al. | |
| 9,251,086 B2* | 2/2016 | Peterson | G06F 12/0868 |
| 2004/0128470 A1* | 7/2004 | Hetzler | G06F 12/0804 711/209 |
| 2007/0168394 A1 | 7/2007 | Vivekanand | |
| 2010/0100687 A1 | 4/2010 | Ramadas | |
| 2010/0329256 A1* | 12/2010 | Akella | H04L 12/4625 370/392 |
| 2011/0179228 A1* | 7/2011 | Amit | G06F 3/0608 711/135 |
| 2011/0296133 A1* | 12/2011 | Flynn | G06F 11/1048 711/171 |
| 2013/0018932 A1* | 1/2013 | Bhaskar | H03M 7/3088 708/203 |
| 2013/0198454 A1 | 8/2013 | Sparenberg et al. | |
| 2014/0223029 A1* | 8/2014 | Bhaskar | H03M 7/3088 709/247 |

OTHER PUBLICATIONS

Wellsk, "LWIP buffer management", Nov. 28, 2011, LPCware.com, pp. 1-2, NXP, United States [downloaded from http://www.lpcware.com/content/project/lightweight-ip-lwip-networking-stack/lwip-buffer-management on May 28, 2015].

Pai, V.S. et al., "IO—Lite: A Unified I/O Buffering and Caching System", Proceedings of the 3rd Symposium on Systems Design and Implementation, Feb. 1999, pp. 1-15, USENIX, United States Operating.

Chalamalasetti, S.R. et al., "An FPGA Memcached Appliance", Proceedings of the ACM/SIGDA International Symposium on Field Programmable Gate Arrays (FPGA'13), Feb. 11-13, 2013, pp. 245-254, ACM, United States.

Druschel, P. et al., "Fbufs: A High-Bandwidth Cross-Domain Transfer Facility", Proceedings of the 14th ACM Symposium on Operating Systems Principles, Oct. 26, 1993, pp. 1-21, ACM, United States.

Blott, M. et al., "Achieving 10Gbps Line-rate Key-value Stores with FPGAs", Proceedings of the 5th USENIX Workshop on Hot Topics in Cloud Computing (HotCloud'13), Jun. 25-26, 2013, pp. 1-18, XILINX, United States.

Nishtala, R. et al., "Scaling Memcache at Facebook", Proceeding of the 10th USENIX Symposium on Networked Systems Design and Implementation (NSDI'13), 2013, pp. 385-398, USENIX Association, United States.

Gunther, N. et al., "Hidden Scalability Gotchas in Memcached and Friends", Proceedings of the 2010 Web Performance and Operations Conference, Jun. 24, 2010, p. 1-36, Oracle, United States.

Hariharan. R., "Scaling Memcached on AMD processors", AMD white paper, Aug. 23, 2014, pp. 1-12, AMD, United States.

Berezecki, M. et al., "Many-Core Key-Value Store", Proceedings of the International Green Computing Conference and Workshops (IGCC 2011), Jul. 25-28, 2011, pp. 1-8, IEEE, United States.

Atikoglu, B. et al., "Workload Analysis of a Large-Scale Key-Value Store", Proceedings of the 12th ACM Sigmetrics/Performance Joint International Conference on Measurement and Modeling of Computer Systems (SIGMETRICS'12), Jun. 11-15, 2012, pp. 53-64, ACM, United States.

Wiggins, A. et al., "Enhancing the Scalability of Memcached", Intel Technical Report, May 17, 2012, pp. 1-34, Intel Corporation, United States.

Tatarinov, I., "Peformance Analysis of Cache Policies for Web Servers", 1998, pp. 1-20, United States.

Aggarwal, C. et al., "Caching on the World Wide Web", IEEE Transactions on Knowledge and Data Engineering, Jan. 1999, pp. 1-16, IEEE Xplore, United States.

\* cited by examiner

US 9,860,332 B2

CACHING ARCHITECTURE FOR PACKET-FORM IN-MEMORY OBJECT CACHING

CROSS-REFERENCE TO RELATED APPLICATIONS

This application claims priority to U.S. Provisional Patent Application Ser. No. 61/821,156, filed on May 8, 2013, which is incorporated herein by reference.

TECHNICAL FIELD

One or more embodiments relate generally to web object caching, and in particular, a high-performance web-object caching architecture for packet-form in-memory storage.

BACKGROUND

Web object caching is a mechanism for temporarily storing (i.e., caching) web objects, such as HTML pages, image files, audio files and video files, to reduce bandwidth usage, server load, and perceived lag. Web object caches may be used in various systems (e.g., search engines, content websites, shopping websites, etc.) by Internet-based service providers.

SUMMARY

One embodiment provides a caching system comprising a hash table, a network interface for receiving a sequence of network-level packets for caching, and a caching application module for storing the sequence of network-level packets in the hash table. The sequence of network-level packets is stored in its original form without de-fragmentation.

These and other aspects and advantages of one or more embodiments will become apparent from the following detailed description, which, when taken in conjunction with the drawings, illustrate by way of example the principles of one or more embodiments.

BRIEF DESCRIPTION OF THE DRAWINGS

For a fuller understanding of the nature and advantages of one or more embodiments, as well as a preferred mode of use, reference should be made to the following detailed description read in conjunction with the accompanying drawings, in which.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Figure 1:
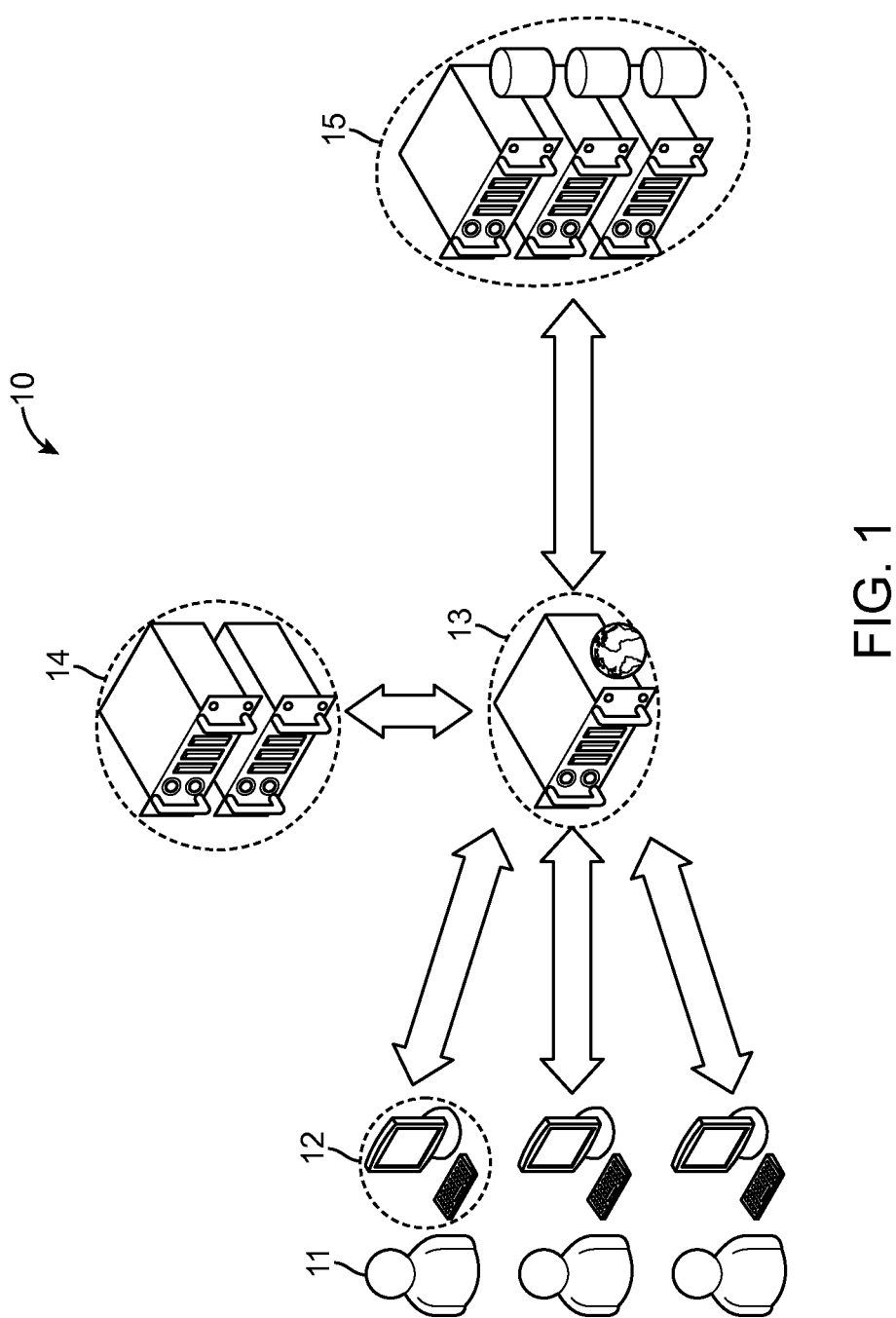
FIG. 1 illustrates a block diagram of an example networked system.

FIG. 1 illustrates a block diagram of an example networked system 10. The networked system 10 comprises at least one client device 12. A client device 12 represents an electronic device of a user client 11. An electronic device may be an appliance (e.g., a television (TV) such as a smart TV), a personal computer (PC), a server, or a mobile device (e.g., a mobile phone such as a smart phone, a laptop computer, a tablet).

A user client 11 may request an Internet-based service (e.g., a Web service) and/or content (e.g., web page, image file, audio file, video file, etc.) from an Internet-based service provider via a client device 12. A client device 12 may send a request for an Internet-based service and/or content to a front-end web server 13 of an Internet-based service provider over a connection (e.g., a wireless connection, a wired connection, or a combination of the two).

To reduce network traffic and user access times to Internet-based services and/or content, an Internet-based service provider may utilize web object caching. For example, an Internet-based service provider may utilize one or more in-memory key-value stores 14 for caching web objects that are frequently accessed by its user clients 11. An in-memory key-value store 14 comprises a hash table for caching web objects, and a replacement algorithm (i.e., eviction logic). The in-memory key-value store 14 indexes web objects by unique keys. For example, URLs may be used as keys for the web objects, and the web objects may be the values.

An example in-memory key-value store 14 is Memcached. Memcached typically serves as a cache for slower and larger backing non-volatile storage. Memcached may be distributed over one or more local servers of the Internet-based service provider.

When a front-end web server 13 receives a request from a client device 12, the front-end web server 13 first attempts to resolve the request using one or more in-memory key-value stores 14. An instance of an in-memory key-value store 14 running on a single local server may comprise multiple worker threads for satisfying requests for caching operations, such as the GET request for retrieving a cached value from the hash table, the DELETE request for deleting a cached value from the hash table, the SET request for caching a new value in the hash table, and the UPDATE request for replacing a cached value in the hash table.

A cache miss occurs when a requested cached value is not cached in the in-memory key-value store 14 used to resolve the request. When a cache miss occurs, the front-end web server 13 forwards the request to a back-end server 15 to resolve the request. Upon receiving a response to the request from the back-end server 15, the front-end web server 13 updates the in-memory key-value store 14 by adding any missing cached value included in the response to the hash table. The front-end web server 13 then constructs and sends a final response to the client device 12 that the request originated from.

When an ADD request or a REPLACE request encounters an in-memory key-value store 14 that is full, an eviction operation based on a replacement algorithm is triggered to evict at least one cached value from the in-memory key-value store 14, thereby allowing caching of new values. An example replacement algorithm is the Least Recently Used (LRU) algorithm. The LRU algorithm evicts the least recently accessed cached value based on a list of cached values ordered based on access time.

Figure 2:
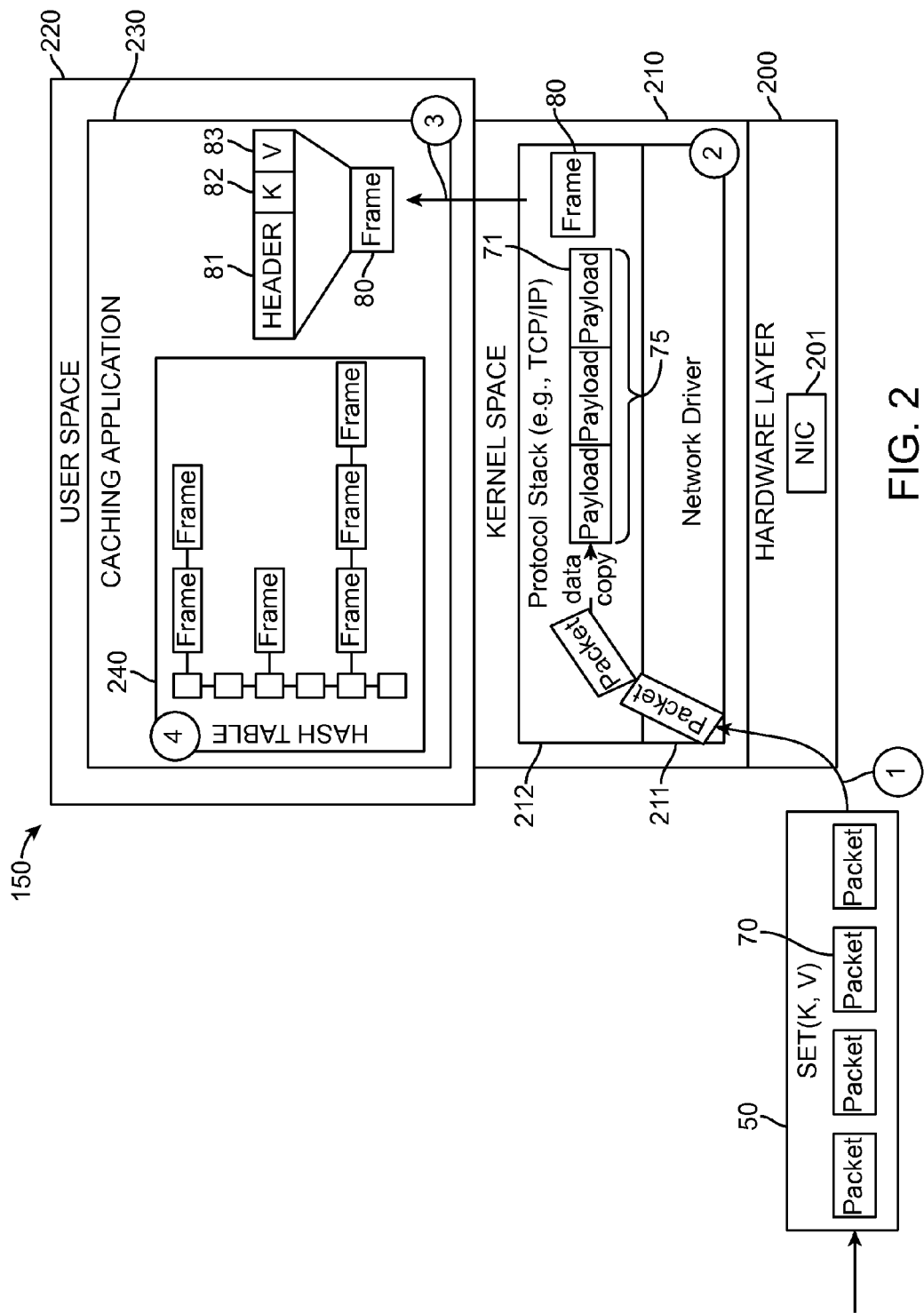
FIG. 2 illustrates ingress flow for a typical caching architecture.

FIG. 2 illustrates ingress flow for a typical caching architecture 150. The caching architecture 150 may be distributed over one or more servers, such as one or more local servers of an Internet-based service provider. The caching architecture 150 implements a conventional in-memory key-value store (e.g., Memcached) that includes a hash table 240.

The caching architecture 150 comprises a hardware layer 200, a kernel space 210, and a user space 220. The hardware layer 200 comprises a network interface card (NIC) 201. The hardware layer 200 may further comprise one or more hardware resources, such as a central processing unit (CPU).

A process is an executing (i.e., running instance) of a software application program. One or more processes of one or more software application programs may run within the user space 220. For example, the user space 220 includes a caching application 230 comprising one or more worker threads for handling caching operations for the hash table 240.

The kernel space 210 comprises a network driver 211 and a protocol stack 212 (e.g., a TCP/IP protocol stack). The kernel space 210 executes an operating system kernel that provides services for managing hardware resources of the hardware layer 200 and facilitating how software application programs in the user space 220 run and utilize the hardware resources. The kernel functions as an intermediary between the software application programs and the hardware resources.

Figure 4:
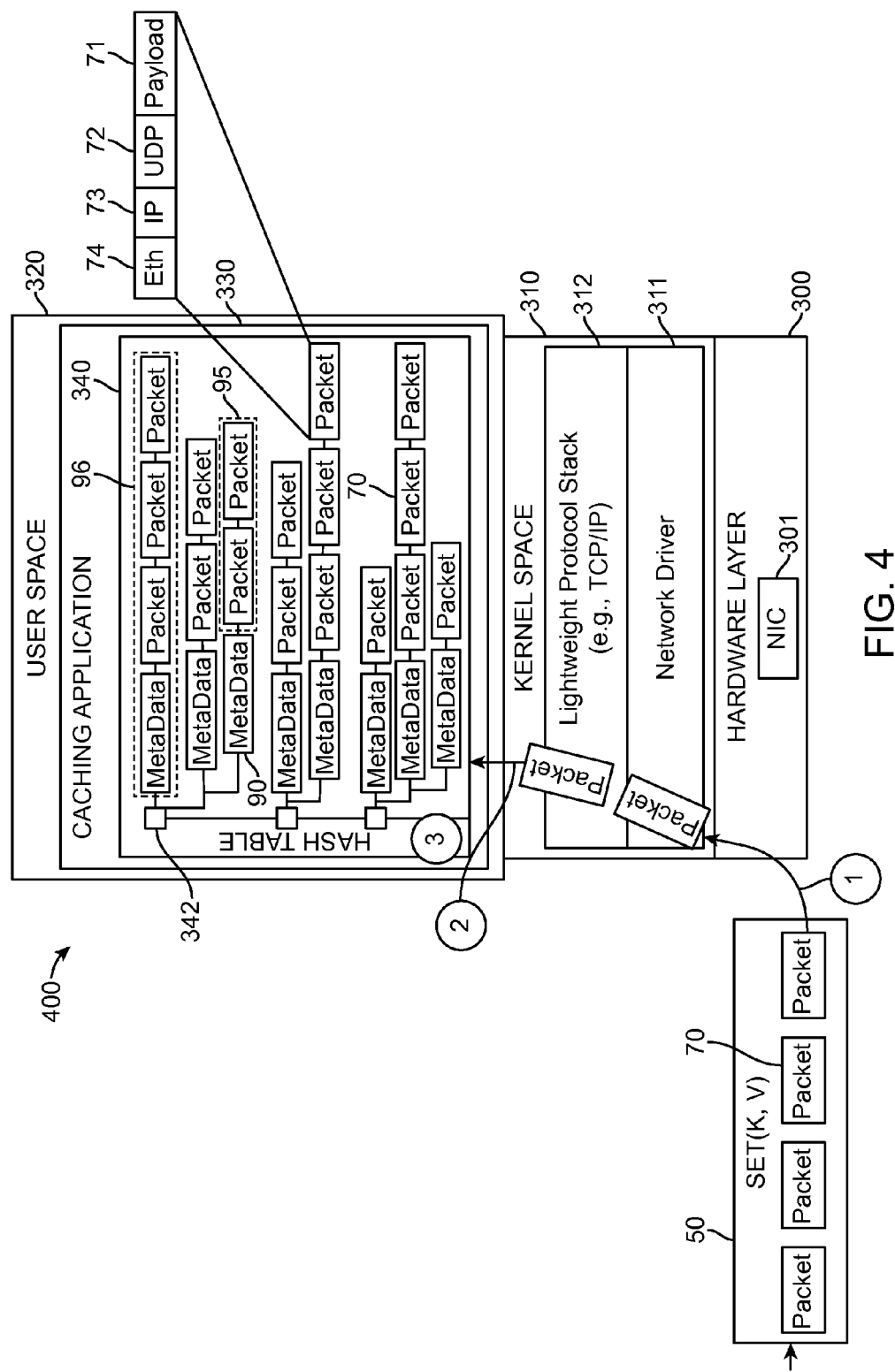
FIG. 4 illustrates ingress flow for an example caching architecture, in accordance with an embodiment of the invention.

As represented by action bubble 1 in FIG. 2, the NIC 201 receives a SET request 50 for a key-value pair K,V, wherein K is a key, and wherein V is a value associated with the key K. The value V comprises a sequence of network-level packets ("network packets") 70. Each network packet 70 comprises a packet payload 71 and network headers, such as an Ethernet header 74 (FIG. 4), an IP header 73 (FIG. 4), and a UDP header 72 (FIG. 4). The network packets 70 may represent Ethernet frames.

As represented by action bubble 2 in FIG. 2, the network packets 70 are assembled into an application-level frame ("application frame") 80 within the kernel space 210. Specifically, the caching architecture 150 performs de-fragmentation of the network packets 70. Each packet payload 71 of each network packet 70 is copied into a contiguous memory region 75 allocated for the application frame 80. The application frame 80 is a higher-level protocol frame, such as a TCP/IP frame.

The packet payloads 71 copied represents the key-value pair K,V for caching in the hash table 240. As shown in FIG. 2, the application frame 80 includes data fields 82 and 83 comprising the key K and the value V, respectively. In addition to the key-value pair K,V, the application frame 80 further includes an application header 81 comprising application-specific header data, such as command types, key length, time stamp, etc.

As represented by action bubble 3 in FIG. 2, the application frame 80 is transferred from the kernel space 210 to the user space 220. The application frame 80 may be transferred by copying or by mapping memory (i.e., zero-copy memory mapping).

As represented by action bubble 4 in FIG. 2, the caching application 230 processes the application frame 80, and caches the application frame 80 in the hash table 240.

Figure 3:
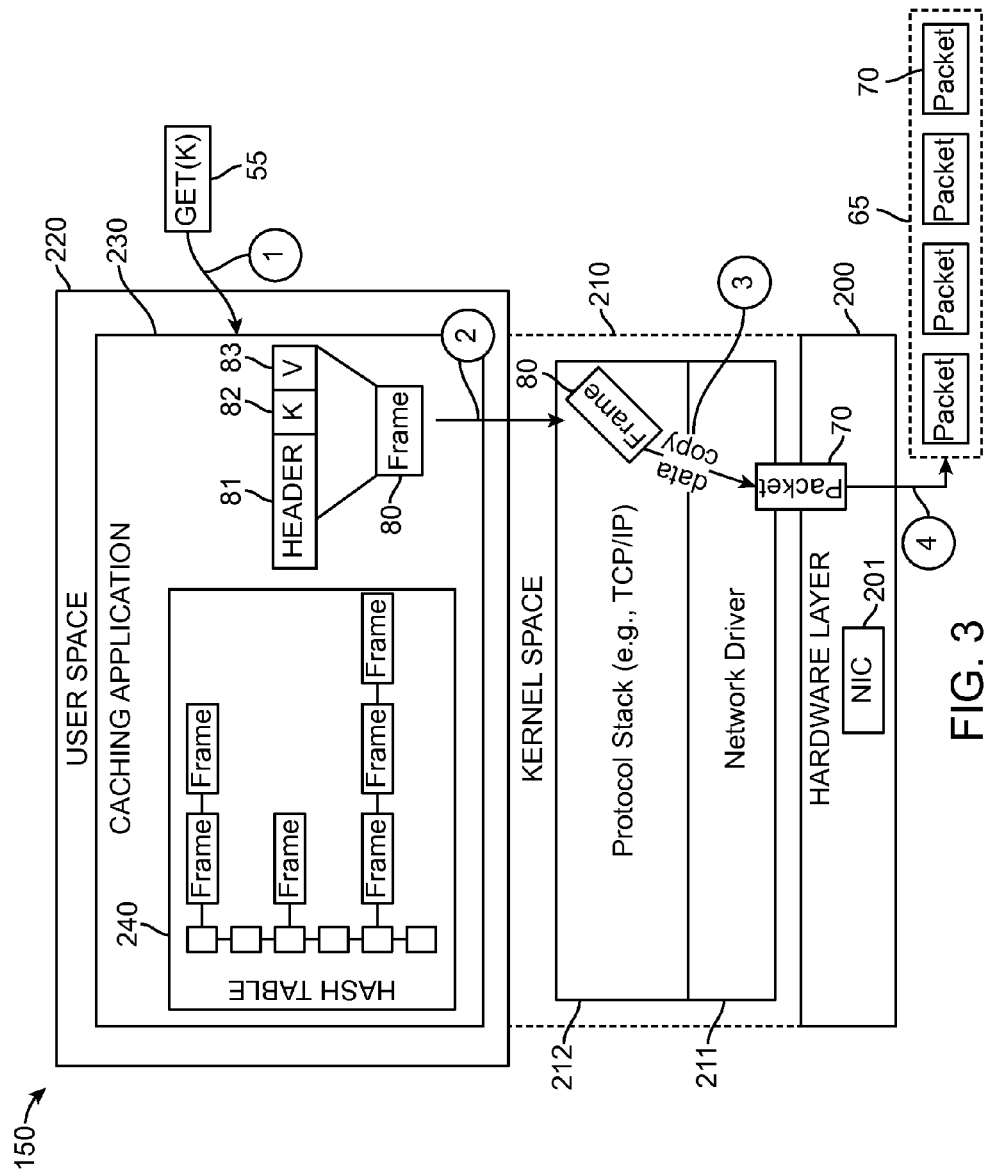
FIG. 3 illustrates egress flow for a typical caching architecture.

FIG. 3 illustrates egress flow for a typical caching architecture 150. As represented by action bubble 1 in FIG. 3, the caching application 230 receives and processes a GET request 55 for a given key K. The given key K is associated with a cached value V in the hash table 240. Using the given key K, the caching application 230 retrieves an application frame 80 including the requested cached value V from the hash table 240.

As represented by action bubble 2 in FIG. 3, the application frame 80 retrieved is then transferred from the user space 220 to the kernel space 210. The application frame 80 may be transferred by copying or by zero-copy memory mapping.

As represented by action bubble 3 in FIG. 3, within the kernel space 210, fragmentation is performed whereby data from the application frame 80 is fragmented into a sequence of network packets 70. Specifically, data from the requested cached value V is copied into packet payloads 71 of the sequence of network packets 70.

As represented by action bubble 4 in FIG. 3, the NIC 201 transmits a GET response 65, wherein the GET response 65 comprises the sequence of network packets 70.

FIG. 4 illustrates ingress flow for an example caching architecture 400, in accordance with an embodiment of the invention. The caching architecture 400 may be distributed over one or more servers, such as one or more local servers of an Internet-based service provider. The caching architecture 400 implements an in-memory key-value store including a hash table 340 that supports packet-form in-memory storage.

The caching architecture 400 comprises a hardware layer 300, a kernel space 310, and a user space 320. The hardware layer 300 comprises a network interface card (NIC) 301. The hardware layer 300 may further comprise one or more hardware resources, such as a central processing unit (CPU).

The user space 320 includes a caching application 330 comprising one or more worker threads for handling caching operations for the hash table 340.

The kernel space 310 comprises a network driver 311 and a lightweight protocol stack 312 (e.g., a TCP/IP protocol stack).

As represented by action bubble 1 in FIG. 4, the NIC 301 receives a SET request 50 for a key-value pair K,V, wherein K is a key, and wherein V is a value associated with the key K. The value V comprises a sequence of network packets 70. Each network packet 70 comprises a packet payload 71 and network headers, such as an Ethernet header 74, an IP header 73, and a UDP header 72. The network packets 70 may represent Ethernet frames. The NIC 301 transfers the sequence of network packets 70 to the kernel space 310. In one embodiment, the sequence of network packets 70 is transferred via direct memory access (DMA).

As represented by action bubble 2 in FIG. 4, the protocol stack 312 then transfers the sequence of network packets 70 from the kernel space 310 to the user space 320. The sequence of network packets 70 are transferred using zero-copy memory mapping. During zero-copy memory mapping, no copying of network packets 70 occurs between the kernel space 310 and the user space 320. The network packets 70 are transferred using only pointer passing.

Therefore, unlike the caching architecture 150 in FIG. 2, the caching architecture 400 does not require de-fragmentation of network packets 70. The sequence of network packets 70 need not be re-assembled into an application frame 80, thereby eliminating the need for memory copies. Eliminating the need for memory copies reduces latency and increases throughput of the caching architecture 400.

As represented by action bubble 3 in FIG. 4, the caching application 330 processes the sequence of network packets 70 by generating a meta-data header 90 for the sequence of network packets 70. The meta-data header 90 and the sequence of network packets 70 form the corresponding key-value pair K,V. As described in detail later herein, the meta-data header 90 includes a group of data fields that facilitate access to the corresponding key-value pair K,V in the hash table 340 and management of the key-value pair K,V.

A bucket list of the hash table 340 is looked-up according to a given key. The meta-data header 90 is hooked into the bucket list. Each network packet 70 of the sequence of network packets 70 is cached in the hash table 340 with its original network headers, such as the Ethernet header 74, the IP header 73 and the UDP header 72.

Therefore, unlike the caching architecture 150 in FIG. 2, the caching architecture 400 caches network packets 70 in their original form. Each cached key-value pair 96 in the hash table 340 comprises a meta-data header 90 coupled to a linked list 95 of network packets 70. Each bucket 342 of the hash table 340 is configured to maintain one or more cached key-value pairs 96.

Figure 5:
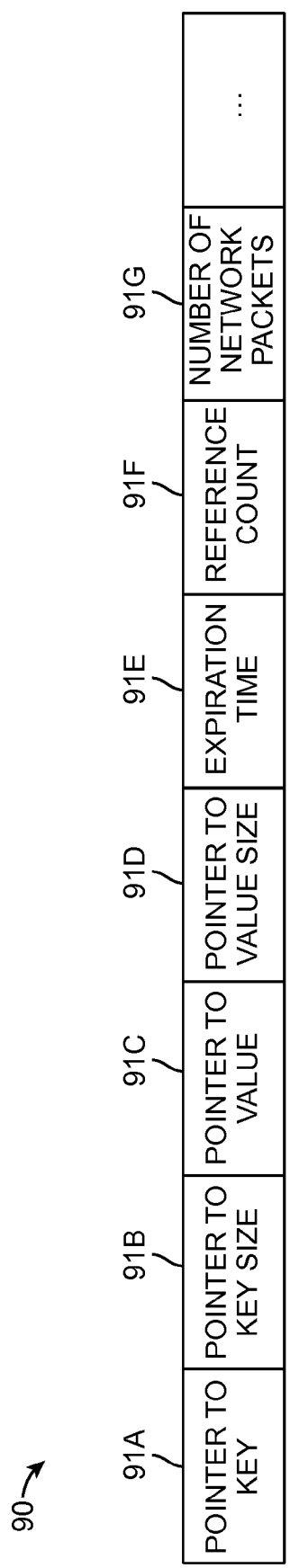
FIG. 5 illustrates an example meta-data header, in accordance with an embodiment of the invention.

FIG. 5 illustrates an example meta-data header 90, in accordance with an embodiment of the invention. The meta-data header 90 includes multiple data fields for easing access to a corresponding key-value pair, such as a first data field 91A comprising a pointer to a key, a second data field 91B comprising a pointer to information representing the size of the key, a third data field 91C comprising a pointer to a value, and a fourth data field 91D comprising a pointer to information representing the size of the value. The meta-data header 90 further includes additional data fields for management of the key-value pair, such as a fifth data field 91E comprising information identifying when the key-value pair should be evicted from the hash table 340, a sixth data field 91F comprising an atomic reference count for facilitating multi-threaded processing, and a seventh data field 91G comprising information representing the total number of network packets 70 included in the key-value pair.

The meta-data header 90 may include additional data fields. For example, in one embodiment where partitioned memory allocators are used to minimize memory contention on allocation during multi-threaded processing, the meta-data header 90 may include memory allocator information.

Figure 6:
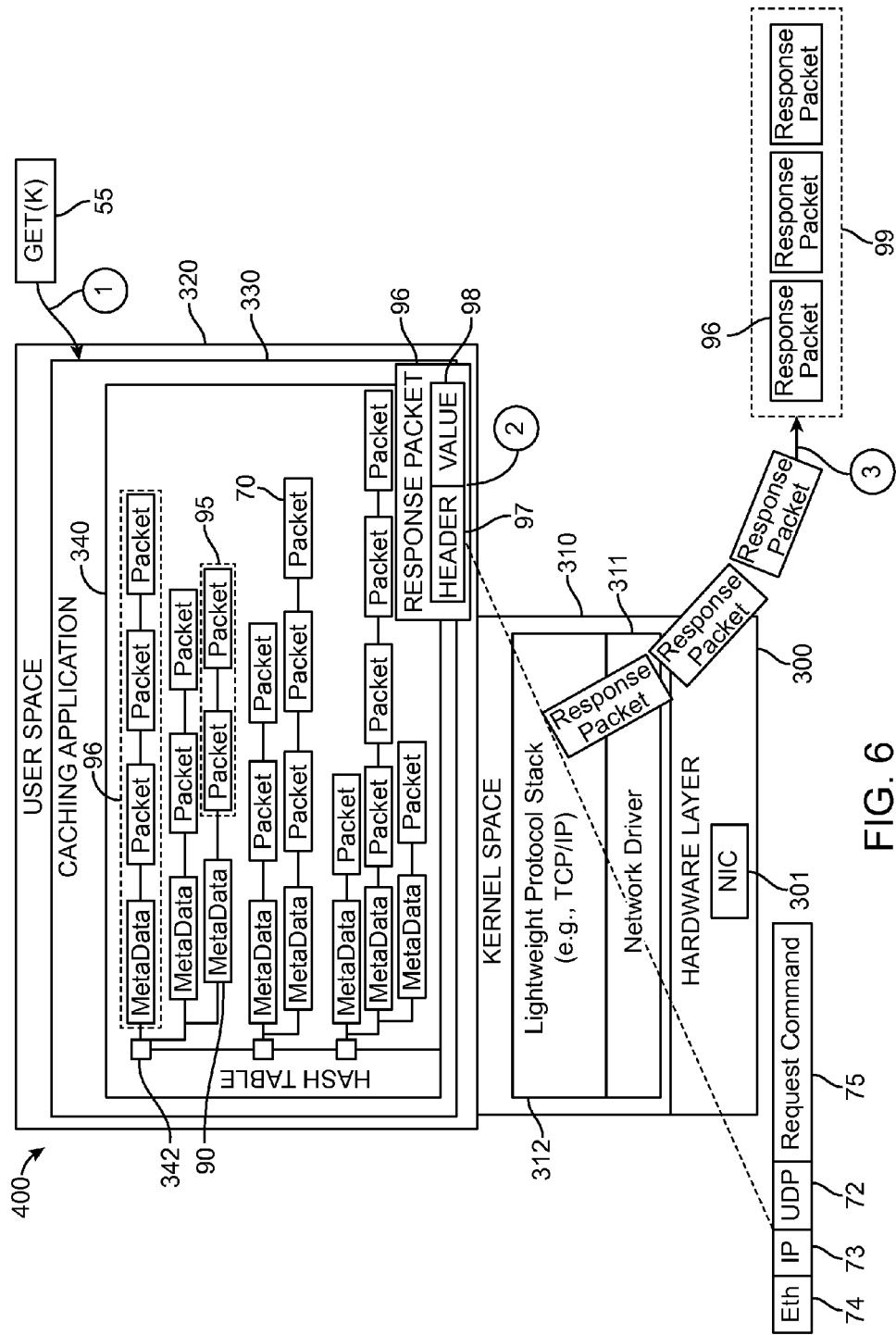
FIG. 6 illustrates egress flow for the example caching architecture, in accordance with an embodiment of the invention.

FIG. 6 illustrates egress flow for the example caching architecture 400, in accordance with an embodiment of the invention. As represented by action bubble 1 in FIG. 6, the caching application 330 receives and processes a GET request 55 for a given key K. The given key K is associated with a cached value V in the hash table 340. The caching application 330 retrieves the cached value V from the hash table 340 by performing a look-up of the hash table 340 using the given key K.

As represented by action bubble 2 in FIG. 6, the kernel space 310 generates a GET response 99 based on the sequence of network packets 70 included in the cached value V. The caching architecture 400 transfers the sequence of network packets 70 from the user space 320 to the kernel space 310 using zero-copy memory mapping. The GET response 99 comprises a sequence of response packets 96, wherein each response packet 96 is a network-level packet. Each response packet 96 is a network-level packet including a value 98 representing a packet payload 71 of a cached network packet 70, and header information 97. In one embodiment, the header information 97 includes a request command 75 and network headers that the caching architecture 400 creates based on source information included in the GET request 55. For example, the header information 97 may include an Ethernet header 74, an IP header 73 and a UDP header 72. The request command 75 comprises application-specific header data. For example, as the GET response 99 is a response to a GET request 55, the request command 75 will comprise information indicating that the GET response 99 is a response/reply to the GET request 55.

Therefore, unlike the caching architecture 150 in FIG. 3, the caching architecture 400 does not require fragmentation of cached network packets 70 when satisfying a GET request. Instead, the caching architecture 400 fulfills each GET request by constructing a GET response 99 directly from cached network packets 70. By utilizing zero-copy memory passing, the caching architecture 400 eliminates the need to copy cached network packets 70 between the user space 320 and the kernel space 310. Eliminating the need for memory copies reduces latency and increases throughput of the caching architecture 400.

As represented by action bubble 3 in FIG. 6, the NIC 301 then transmits the GET response 99. In one embodiment, the GET response 99 is constructed as a buffer chain, and the NIC 301 transmits the buffer chain. No memory copies are required if the NIC 301 is able to transmit the buffer chain. Memory copies, however, are required if the NIC 301 is not able to transmit the buffer chain.

The caching architecture 400 is configured to handle concurrent caching operations. For example, maintaining an atomic reference count 91F for a sequence of network packets 70 ensures that the network packets 70 are not prematurely deleted by a DELETE request when the network packets 70 are used to construct a GET response 99.

The caching architecture 400 may be realized in software (e.g., a monolithic kernel, a microkernel based operating system), hardware (e.g., an application-specific integrated circuit), or programmed in customizable hardware (e.g., a field-programmable gate array).

Figure 7:
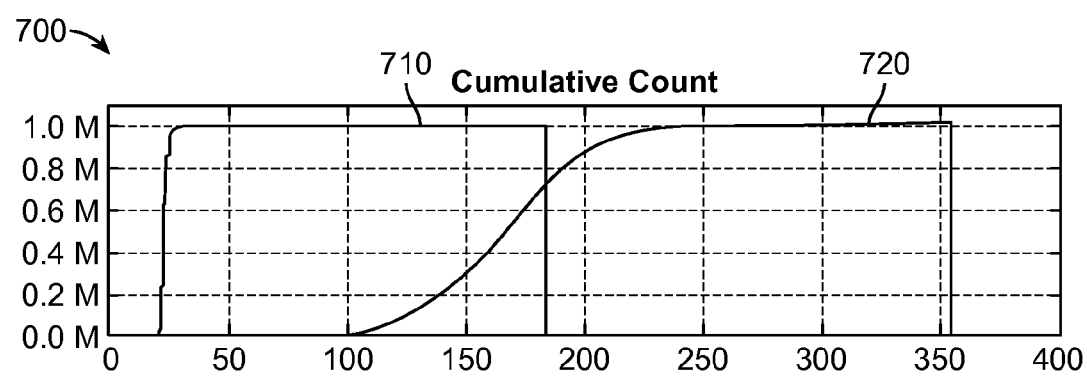
FIG. 7 is a graph illustrating average latency for different in-memory key-value stores, including the caching architecture, in accordance with an embodiment.

FIG. 7 is a graph 700 illustrating average latency for different in-memory key-value stores, including the caching architecture 400, in accordance with an embodiment. A first graph plot 710 represents average latency for one million GET requests for the caching architecture 400. A second graph plot 720 represents average latency for one million GET requests for Memcached. The caching architecture 400 scales better than Memcached.

Figure 8:
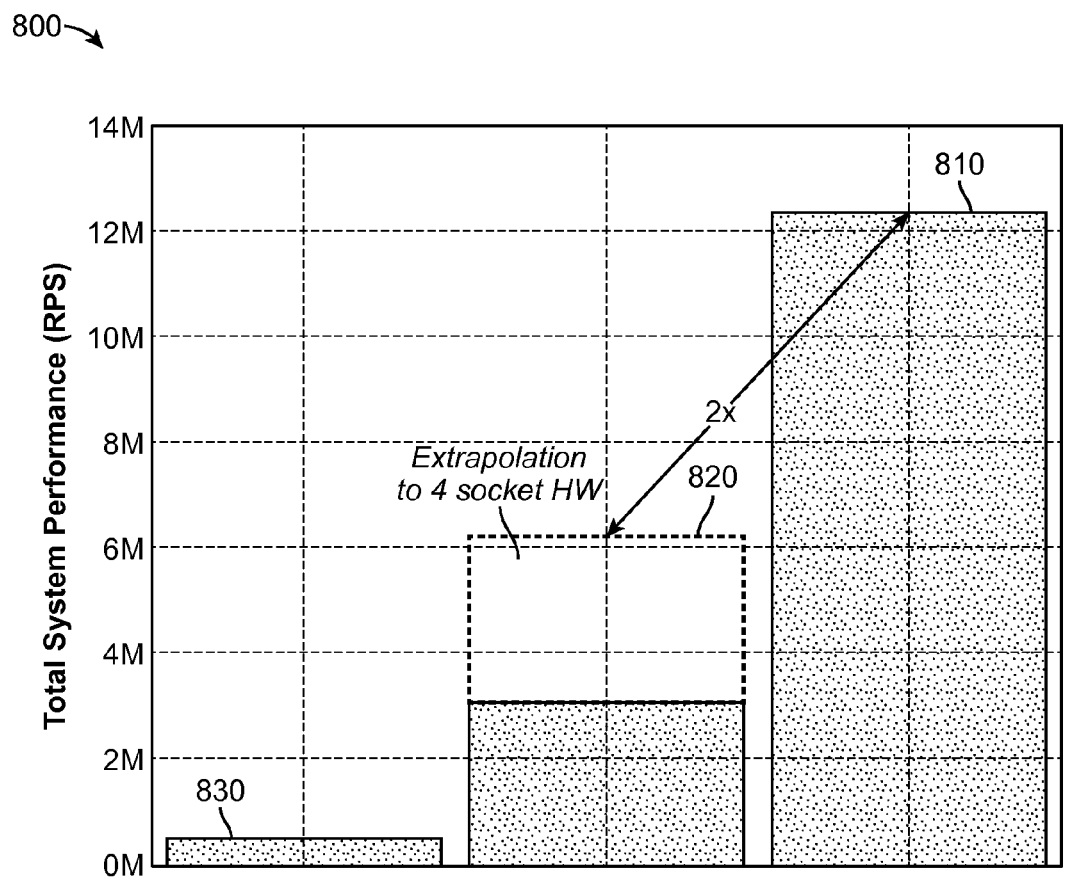
FIG. 8 is a graph illustrating throughput for different in-memory key-value stores, including the caching architecture, in accordance with an embodiment.

FIG. 8 is a graph 800 illustrating throughput for different in-memory key-value stores, including the caching architecture 400, in accordance with an embodiment. A first graph plot 810 represents throughput for the caching architecture 400. A second graph plot 820 represents throughput for Memcached implementing a LRU replacement algorithm. A third graph plot 830 represents throughput for Memcached. The caching architecture 400 scales better than the other in-memory key-value stores shown in FIG. 8.

Figure 9:
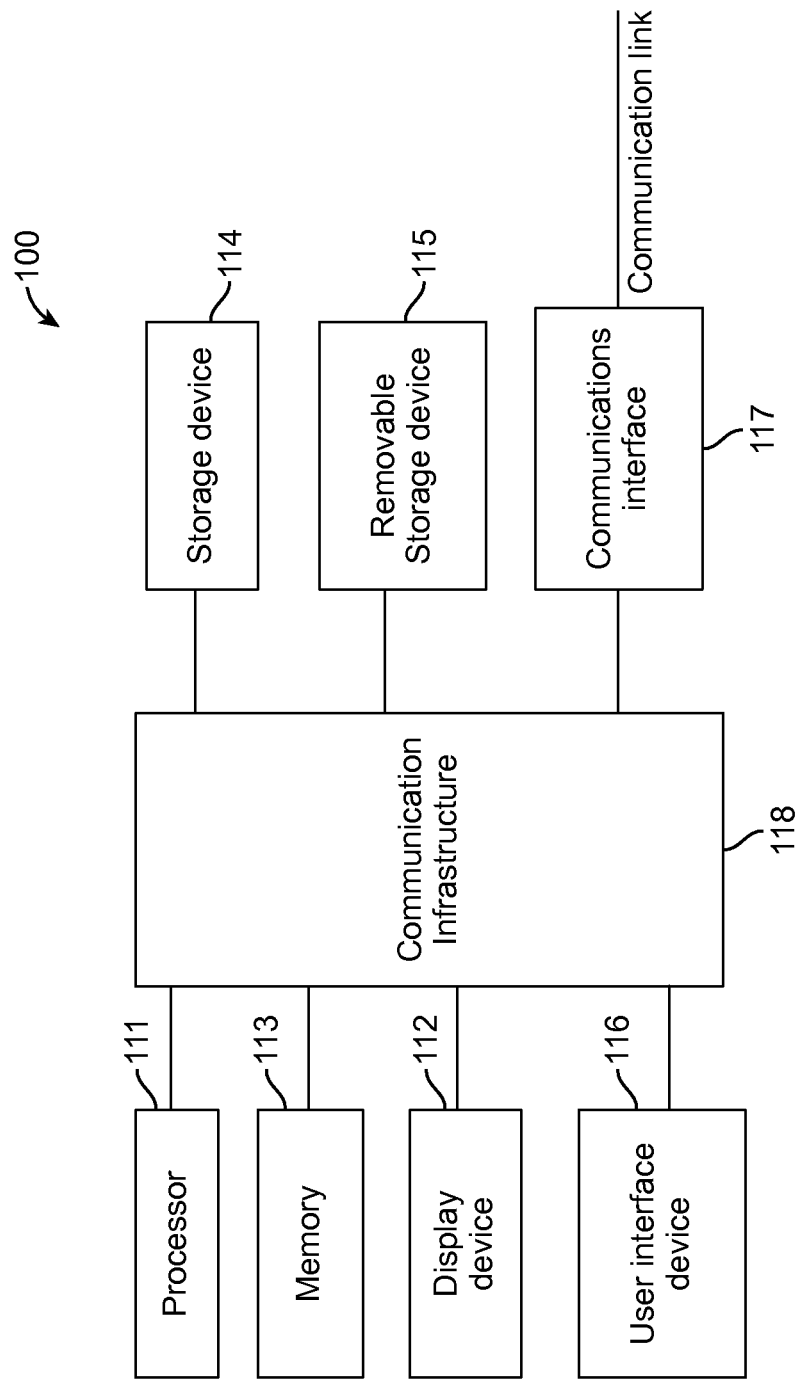
FIG. 9 is a high level block diagram showing an information processing system comprising a computer system useful for implementing an embodiment of the present invention.

FIG. 9 is a high level block diagram showing an information processing system comprising a computer system 100 useful for implementing an embodiment of the present invention. The computer system 100 includes one or more processors 111, and can further include an electronic display device 112 (for displaying graphics, text, and other data), a main memory 113 (e.g., random access memory (RAM)), storage device 114 (e.g., hard disk drive), removable storage device 115 (e.g., removable storage drive, removable memory module, a magnetic tape drive, optical disk drive, computer readable medium having stored therein computer software and/or data), user interface device 116 (e.g., keyboard, touch screen, keypad, pointing device), and a communication interface 117 (e.g., modem, a network interface (such as an Ethernet card), a communications port, or a PCMCIA slot and card). The communication interface 117 allows software and data to be transferred between the computer system and external devices. The system 100 further includes a communications infrastructure 118 (e.g., a communications bus, network) to which the aforementioned devices/modules 111 through 117 are connected.

Information transferred via communications interface 117 may be in the form of signals such as electronic, electromagnetic, optical, or other signals capable of being received by communications interface 117, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, web servers, etc. Further, embodiments of said architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of one or more embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the one or more embodiments have been described with reference to certain versions thereof; however, other versions are possible. Therefore, the spirit and scope of the appended claims should not be limited to the description of the preferred versions contained herein.

What is claimed is:

1. A caching system, comprising:
    at least one processor; and
    a non-transitory processor-readable memory device storing instructions that when executed by the at least one processor causes the at least one processor to perform operations including:
        maintaining a hash table;
        receiving a sequence of network-level packets for caching, wherein each network-level packet of the sequence of network-level packets comprises at least one network header; and
        caching the sequence of network-level packets in the hash table in its original form by storing the sequence of network-level packets in the hash table as a linked list of network packets together with corresponding metadata for the sequence of network-level packets, wherein the linked list comprises each network-level packet of the sequence of network-level packets and each network header included in the network-level packet, and the corresponding metadata comprises information common to each network-level packet of the sequence of network-level packets.

2. The caching system of claim 1, wherein the sequence of network-level packets is cached in the hash table without de-fragmentation of network-level packets included in the sequence of network-level packets, thereby removing the need to re-assemble the network-level packets into an application frame, and further removing the need to copy the network-level packets.

3. The caching system of claim 1, wherein the operations further comprise:
generating the corresponding metadata, wherein the corresponding metadata comprises a corresponding metadata header including the information common to each network-level packet of the sequence of network-level packets; and
storing the sequence of network-level packets in the hash table together with the corresponding metadata header.

4. The caching system of claim 3, wherein the information common to each network-level packet of the sequence of network-level packets comprises one or more of the following: access information to a key included in the sequence of network-level packets, access information to a value included in the sequence of network-level packets, expiration time information identifying when to remove the sequence of network-level packets from the hash table, an atomic reference count for enabling multi-threaded processing, and information identifying the total number of network-level packets included in the sequence of network-level packets.

5. The caching system of claim 1, wherein the operations further comprise:
receiving a request for the sequence of network-level packets, wherein the request includes a key associated with the sequence of network-level packets;
performing a look-up of the hash table using the key;
retrieving the sequence of network-level packets associated from the hash table; and
generating a response to the request based on the sequence of network-level packets.

6. The caching system of claim 5, wherein the response is generated without fragmentation of network-level packets included in the sequence of network-level packets.

7. The caching system of claim 1, wherein the operations further comprise:
enabling concurrent caching operations.

8. A method, comprising:
maintaining a hash table;
receiving a sequence of network-level packets for caching, wherein each network-level packet of the sequence of network-level packets comprises at least one network header; and
caching the sequence of network-level packets in the hash table in its original form by storing the sequence of network-level packets in the hash table as a linked list of network packets together with corresponding metadata for the sequence of network-level packets, wherein the linked list comprises each network-level packet of the sequence of network-level packets and each network header included in the network-level packet, and the corresponding metadata comprises information common to each network-level packet of the sequence of network-level packets.

9. The method of claim 8, wherein the sequence of network-level packets is cached in the hash table without de-fragmentation of network-level packets included in the sequence of network-level packets, thereby removing the need to re-assemble the network-level packets into an application frame, and further removing the need to copy the network-level packets.

10. The method of claim 8, further comprising:
generating the corresponding metadata, wherein the corresponding metadata comprises a corresponding metadata header including the information common to each network-level packet of the sequence of network-level packets; and
storing the sequence of network-level packets in the hash table together with the corresponding metadata header.

11. The method of claim 10, wherein the information common to each network-level packet of the sequence of network-level packets comprises one or more of the following: access information to a key included in the sequence of network-level packets, access information to a value included in the sequence of network-level packets, expiration time information identifying when to remove the sequence of network-level packets from the hash table, an atomic reference count for enabling multi-threaded processing, and information identifying the total number of network-level packets included in the sequence of network-level packets.

12. The method of claim 8, further comprising:
receiving a request for the sequence of network-level packets, wherein the request includes a key associated with the sequence of network-level packets;
performing a look-up of the hash table using the key;
retrieving the sequence of network-level packets associated from the hash table; and
generating a response to the request based on the sequence of network-level packets.

13. The method of claim 12, wherein the response is generated without fragmentation of network-level packets included in the sequence of network-level packets.

14. The method of claim 8, further comprising:
enabling concurrent caching operations.

15. A non-transitory computer-readable medium having instructions which when executed on a computer perform a method comprising:
maintaining a hash table;
receiving a sequence of network-level packets for caching, wherein each network-level packet of the sequence of network-level packets comprises at least one network header; and
caching the sequence of network-level packets in the hash table in its original form by storing the sequence of network-level packets in the hash table as a linked list of network packets together with corresponding metadata for the sequence of network-level packets, wherein the linked list comprises each network-level packet of the sequence of network-level packets and each network header included in the network-level packet, and the corresponding metadata comprises information common to each network-level packet of the sequence of network-level packets.

16. The medium of claim 15, wherein the sequence of network-level packets is cached in the hash table without de-fragmentation of network-level packets included in the sequence of network-level packets, thereby removing the need to re-assemble the network-level packets into an application frame, and further removing the need to copy the network-level packets.

17. The medium of claim 15, the method further comprising:
generating the corresponding metadata, wherein the corresponding metadata comprises a corresponding metadata header including the information common to each network-level packet of the sequence of network-level packets; and storing the sequence of network-level packets in the hash table together with the corresponding metadata header.

18. The medium of claim 17, wherein the information common to each network-level packet of the sequence of network-level packets comprises one or more of the following: access information to a key included in the sequence of network-level packets, access information to a value included in the sequence of network-level packets, expiration time information identifying when to remove the sequence of network-level packets from the hash table, an atomic reference count for enabling multi-threaded processing, and information identifying the total number of network-level packets included in the sequence of network-level packets.

19. The medium of claim 15, the method further comprising:
   receiving a request for the sequence of network-level packets, wherein the request includes a key associated with the sequence of network-level packets;
   performing a look-up of the hash table using the key;
   retrieving the sequence of network-level packets associated from the hash table; and
   generating a response to the request based on the sequence of network-level packets.

20. The medium of claim 19, wherein the response is generated without fragmentation of network-level packets included in the sequence of network-level packets.

* * * * *